(12) United States Patent
MacAdam

(10) Patent No.: US 7,596,142 B1
(45) Date of Patent: Sep. 29, 2009

(54) PACKET PROCESSING IN A PACKET SWITCH WITH IMPROVED OUTPUT DATA DISTRIBUTION

(75) Inventor: Angus David Starr MacAdam, Atlanta, GA (US)

(73) Assignee: Integrated Device Technology, Inc, San Jose, CA (US)

( * ) Notice: Subject to any disclaimer, the term of this patent is extended or adjusted under 35 U.S.C. 154(b) by 523 days.

(21) Appl. No.: 11/383,165

(22) Filed: May 12, 2006

(51) Int. Cl.
*H04L 12/56* (2006.01)

(52) U.S. Cl. ............................ 370/392; 370/474

(58) Field of Classification Search ............ None
See application file for complete search history.

(56) References Cited

U.S. PATENT DOCUMENTS

| | | | |
|---|---|---|---|
| 4,932,028 A | 6/1990 | Katircioglu et al. | |
| 4,991,171 A | 2/1991 | Teraslinna | |
| 5,229,991 A | 7/1993 | Turner | |
| 5,305,311 A | 4/1994 | Lyles | |
| 5,440,546 A | 8/1995 | Bianchini, Jr. | |
| 5,999,981 A | 12/1999 | Willenz | |
| 6,598,179 B1 | 7/2003 | Chirashnya et al. | |
| 6,662,339 B1 | 12/2003 | Lanemann et al. | |
| 6,675,325 B1 | 1/2004 | Garney et al. | |
| 6,678,279 B1 | 1/2004 | Meredith | |
| 6,804,237 B1 | 10/2004 | Luo et al. | |
| 6,975,651 B1* | 12/2005 | Ono et al. .............. | 370/474 |
| 7,027,443 B2 | 4/2006 | Nichols | |
| 2001/0014105 A1* | 8/2001 | Tezuka et al. ............ | 370/474 |
| 2002/0085550 A1* | 7/2002 | Rhodes .................. | 370/389 |
| 2005/0232201 A1* | 10/2005 | Bysted et al. ............ | 370/332 |
| 2005/0249244 A1* | 11/2005 | McNamara et al. ....... | 370/474 |
| 2006/0050738 A1* | 3/2006 | Carr et al. ............... | 370/474 |
| 2006/0251069 A1* | 11/2006 | Cathey et al. ............ | 370/389 |

OTHER PUBLICATIONS

"Cisco MDS 9020 Fabric Switch Configuration Guide and Command Reference, Release 2.x," pp. 10-1 through 10-4, Cisco Systems, Inc., Jun. 2005.
Peter J. Welcher, "Configuring SNMP on Switches, and Syslog," Jun. 24, 1999.
"RapidIO Interconnect Specification, Part 8, Error Management, Extensions Specification," RapidIO Trade Association, Jun. 2005.

* cited by examiner

*Primary Examiner*—Phirin Sam
(74) *Attorney, Agent, or Firm*—Stanley J. Pawlik; Kenneth Glass; Glass & Associates

(57) ABSTRACT

A packet switch includes a packet processor for processing data packets. The packet processor receives a data packet including a data payload, identifies data portions in the data payload, and determines a destination address for each data portion. Additionally, the packet processor constructs data packets, each including a data portion and the destination address of the data portion. The packet processor then routes each of the constructed data packets based on a destination identifier of the constructed data packet. An external recipient can then store the data portions of the constructed data packets based on the data addresses in the constructed data packets.

24 Claims, 11 Drawing Sheets

PACKET PROCESSING IN A PACKET SWITCH WITH IMPROVED OUTPUT DATA DISTRIBUTION

CROSS-REFERENCE TO RELATED APPLICATIONS

The present application is related to co-pending U.S. patent application Ser. No. 11/395,575, filed Mar. 31, 2006, entitled "Combined Packet Processor and RIO Switch on Single Chip for DSP Clustered Applications," co-pending U.S. patent application Ser. No. 11/394,886, filed Mar. 31, 2006, entitled "Allocating Destination Addresses to a Switch to Perform Packet Processing on Selected Packets with Corresponding Destination Address," co-pending U.S. patent application Ser. No. 11/395,570, filed Mar. 31, 2006, entitled "Performing Packet Manipulation Options to Transform Packet Data to a Format More Compatible with Processor," co-pending U.S. patent application Ser. No. 11/383,121, filed on May 12, 2006, entitled "Error Management System and Method for a Packet Switch," and co-pending U.S. patent application Ser. No. 11/383,150, filed on May 12, 2006, entitled "System and Method of Constructing Data Packets in a Packet Switch," each of which is incorporated herein by reference in its entirety.

BACKGROUND

1. Field of the Invention

The present invention generally relates to packet switching networks, and more particularly to processing data packets in a packet switch.

2. Description of Related Art

Modern telecommunication networks include packet switching networks for transmitting data from a source device to a destination device. The data is split up and encapsulated into data packets along with a destination identifier of the data. The packet switching network individually routes each data packet through a network of interconnected packet switches based on the destination identifier in the data packet. The data packets may be routed through different paths in the packet switching network and generally arrive at the destination device in an arbitrary order. At the destination device, the data is reconstructed from the data packets.

In some packet switching networks, a packet switch can multicast a data packet. In such a multicast operation, the packet switch duplicates an original data packet and then routes each of the data packets based on the destination identifier of the data packet and a routing table. Because each of the data packets contains the same data payload, multiple devices can receive the same data payload in the multicast operation. In some cases, however, such a multicast operation is an inefficient and inflexible mechanism for delivering data to a device in the telecommunication network.

In light of the above, a need exists for performing an efficient data delivery operation in a packet switch. A further need exists for a flexible data delivery operation in a packet switch.

SUMMARY

In various embodiments, a packet switch includes a packet processor. The packet processor receives a data packet including a data payload, identifies data portions in the data payload, and determines a destination address for each data portion. Additionally, the packet processor constructs data packets, each including a data portion and the destination address of the data portion. The packet processor routes each of the constructed data packets based on a destination identifier of the constructed data packet. In this way, the packet switch distributes the data payload of the data packet. Distributing the data payload of the data packet into multiple data packets is an efficient and flexible way to transmit these data packets to one or more devices because the constructed data packets each contain only a portion of the data payload of the data packet.

A method of processing a data packet in a packet switch, in accordance with one embodiment, includes receiving a data packet by the packet switch. The data packet includes a destination address and a data payload. The method also includes identifying a first data portion and a second data portion in the data payload of the data packet, determining a destination address for the first data portion, and determining a destination address for the second data portion. Further, the method includes constructing a first data packet including the destination address of the first data portion and a data payload including the first data portion. The method also includes constructing a second data packet including the destination address of the second data portion and a data payload including the second data portion. Additionally, the method includes routing the first data packet based on a destination identifier of the first data packet and routing the second data packet based on a destination identifier of the second data packet.

A packet switch, in accordance with one embodiment, includes an input interface and a packet processor coupled to the input interface. The input interface receives a data packet comprising a destination address and a data payload. The packet processor identifies a first data portion and a second data portion of the data payload, determines a destination address for the first data portion, and determines a destination address for the second data portion. Additionally, the packet processor constructs a first data packet including the destination address of the first data portion and a data payload including the first data portion. The packet processor further constructs a second data packet including the destination address of the second data portion and a data payload including the second data portion. The packet processor routes the first data packet based on a destination identifier of the first data packet and routes the second data packet based on a destination identifier of the second data packet.

A system, in accordance with one embodiment, includes a means for receiving a data packet including a destination address and a data payload. The system also includes a means for identifying a first data portion of the data payload and a means for identifying a second data portion of the data payload. The system further includes a means for determining a destination address for the first data portion and a means for determining a destination address for the second data portion. Additionally, the system includes a means for constructing a first data packet including the destination address of the first data portion and a data payload including the first data portion. The system also includes a means for constructing a second data packet including the destination address of the second data portion and a data payload including the second data portion. The system further includes a means for routing the first data packet based on a destination identifier of the first data packet, and a means for routing the second data packet based on a destination identifier of the second data packet.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention. In the drawings.

DETAILED DESCRIPTION

In various embodiments, a packet switch receives a data packet, identifies data portions in the data payload of the data packet, and constructs data packets each including one of the data portions. Additionally, the packet switch determines a destination address for each of the constructed data packets. The packet switch routes each of the constructed data packets based on a destination identifier of the constructed data packet. An external recipient can then receive the constructed data packets and store the data portions into a memory based on the destination addresses in the data packets.

Figure 1:
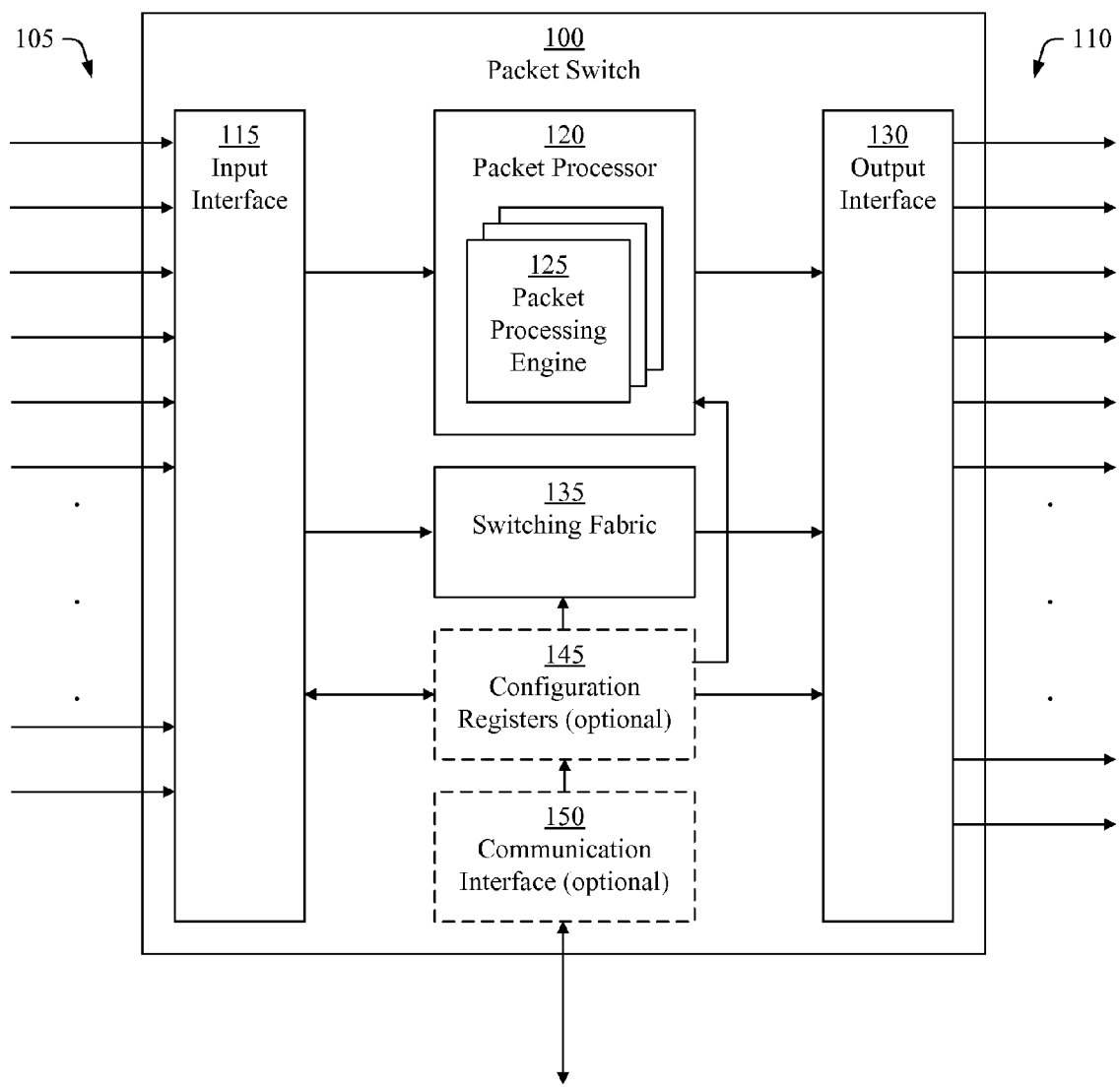
FIG. 1 is a block diagram of a packet switch, in accordance with an embodiment of the present invention.

FIG. 1 illustrates a packet switch 100, in accordance with an embodiment of the present invention. The packet switch 100 includes input ports 105, output ports 110, an input interface 115, an output interface 130, a packet processor 120, and a switching fabric 135. The packet processor 120 and the switching fabric 135 are each coupled to both the input interface 115 and the output interface 130. In one embodiment, the packet switch 100 is implemented in an integrated circuit, which may be packaged as a computer chip.

The input interface 115 receives data packets from external sources of the packet switch 100 at the input ports 105 and individually routes the data packets to the packet processor 120 or the switching fabric 135 based on the content of the data packets. The switching fabric 135 routes data packets received from the input interface 115 to the output interface 130 based on the content of the data packets. The packet processor 120 processes data packets received from the input interface 115 to generate data packets based on the content of the received data packets, and routes the generated data packets to the output interface 130. The input interface 115, the packet processor 120, and the switching fabric 135 can route a data packet, for example, based on a destination identifier in the data packet. The output interface 130 receives data packets from the packet processor 120 and the switching fabric 135 and transmits the data packets to external recipients through the output ports 110.

In various embodiments, the packet processor 120 generates data packets based on data packets received from the input interface 115 and according to one or more packet processing scenarios. The packet processor 120 includes one or more packet processing engines 125 for performing packet processing scenarios on the data packets received from the input interface 115. Each packet processing scenario includes one or more operations to be performed on the data packets received from the input interface 115. The operations of the packet processing scenarios may include operations for manipulating data payloads in the data packets received from the input interface 115. For example, the operations may involve bit extension, bit truncation, bit reordering (e.g., interleaving and/or flipping), or combining (e.g., summing or other arithmetic operations) of data payloads. When used in a signal processing application such as a wireless base station, for example, the packet switch 100 can perform operations on data payloads of the data packets to facilitate baseband processing operations performed downstream of the packet switch 100.

In one embodiment, destination identifiers of the data packets are associated with respective packet processing scenarios. The input interface 115 routes a data packet containing a destination identifier associated with a packet processing scenario to a packet processing engine 125 associated with the packet processing scenario. In turn, the packet processing engine 125 performs the packet processing scenario on the data packet. In this embodiment, the input interface 115 routes data packets containing destination identifiers not associated with a packet processing scenario to the switching fabric 135. In turn, the switching fabric 135 routes the data packets to the output interface 130 based on the destination identifiers of the data packets. Such an approach may be advantageous because any processing of the data packets according to the packet processing scenarios is transparent to the external source and/or the external recipient of the data packets.

In some embodiments, the packet switch 100 may optionally include one or more configuration registers 145. The configuration registers 145 are coupled to components of the packet switch 100, including the input interface 115, the output interface 130, the packet processor 120, and the switching fabric 135. In other embodiments, the configuration registers 145 may be coupled to more or fewer components of the packet switch 100. Further, the packet switch 100 may optionally include a communication interface 150 coupled to the configuration registers 145. The communication interface 150 may be an Inter-Integrated Circuit (I²C) bus interface, a Joint Test Action Group (JTAG) interface, or any other interface that facilitates communication with the packet switch 100.

The configuration registers 145 store configuration data for configuring the packet switch 100. For example, the configuration data may include parameters for defining the function of various components of the packet switch 100. The parameters may define various port configurations, packet processing scenarios, switching functions, communications protocols, and/or messaging formats of the packet switch 100. A user may configure the packet switch 100 by writing configuration data into the configuration registers 145 through the input interface 115 or the communication interface 150.

The configuration registers 145 may include registers to configure speed, timing, and/or other characteristics of the input ports 105 and/or the output ports 110. For example, the configuration registers 145 can be configured to handle long and short haul serial transmission as defined, for example, by a RapidIO™ serial specification, an open standard governed by the RapidIO Trade Association of Austin, Tex. The configuration registers 145 can be configured, for example, during an initialization procedure.

The configuration registers 145 may include registers to configure packet processing scenarios. For example, the configuration registers 145 may define payload formats and operations performed on data payloads of data packets for a packet processing scenario. The packet processing scenarios performed by the packet processing engines 125 may include individual packet processing scenarios or group packet processing scenarios. The packet processor 120 can perform a group packet processing scenario by multicasting data packets to multiple packet processing engines 125. In turn, the packet processing engines 125 can perform packet processing scenarios on the data packets in parallel. Such groupings of individual packet processing scenarios may be configurable, for example, by using the configuration registers 145.

In some embodiments, the input interface 115 has a default (e.g., power-on) configuration to enable communication between the packet switch 100 and an external source. For example, the input interface 115 can receive data packets containing configuration data from an external source and can write the configuration data into the configuration registers 145. In this way, the external source can write configuration data into the configuration registers 145 to configure the packet switch 100.

In various embodiments, the packet switch 100 may be configured to provide packet communications compliant with the RapidIO™ interconnect architecture, an open standard governed by the RapidIO Trade Association of Austin, Tex. The RapidIO™ interconnect architecture includes physical and logical communications specifications for inter-device communications. Although some embodiments described herein relate to RapidIO™ compliant packet switches and operations thereof, the present invention may use other packet communication architectures.

In various embodiments, the packet processor 120 may include a microprocessor, an embedded processor, a microcontroller, a digital signal processor, a logic circuit, software, computing instructions, or any other software or hardware technology for processing data packets. The switching fabric 135 can include any switch, switch interconnect, switching network, software, device, or any hardware or software technology for routing data packets. For example, the switching fabric 135 may include one or more logic circuits interconnected in a switching network.

Figure 2:
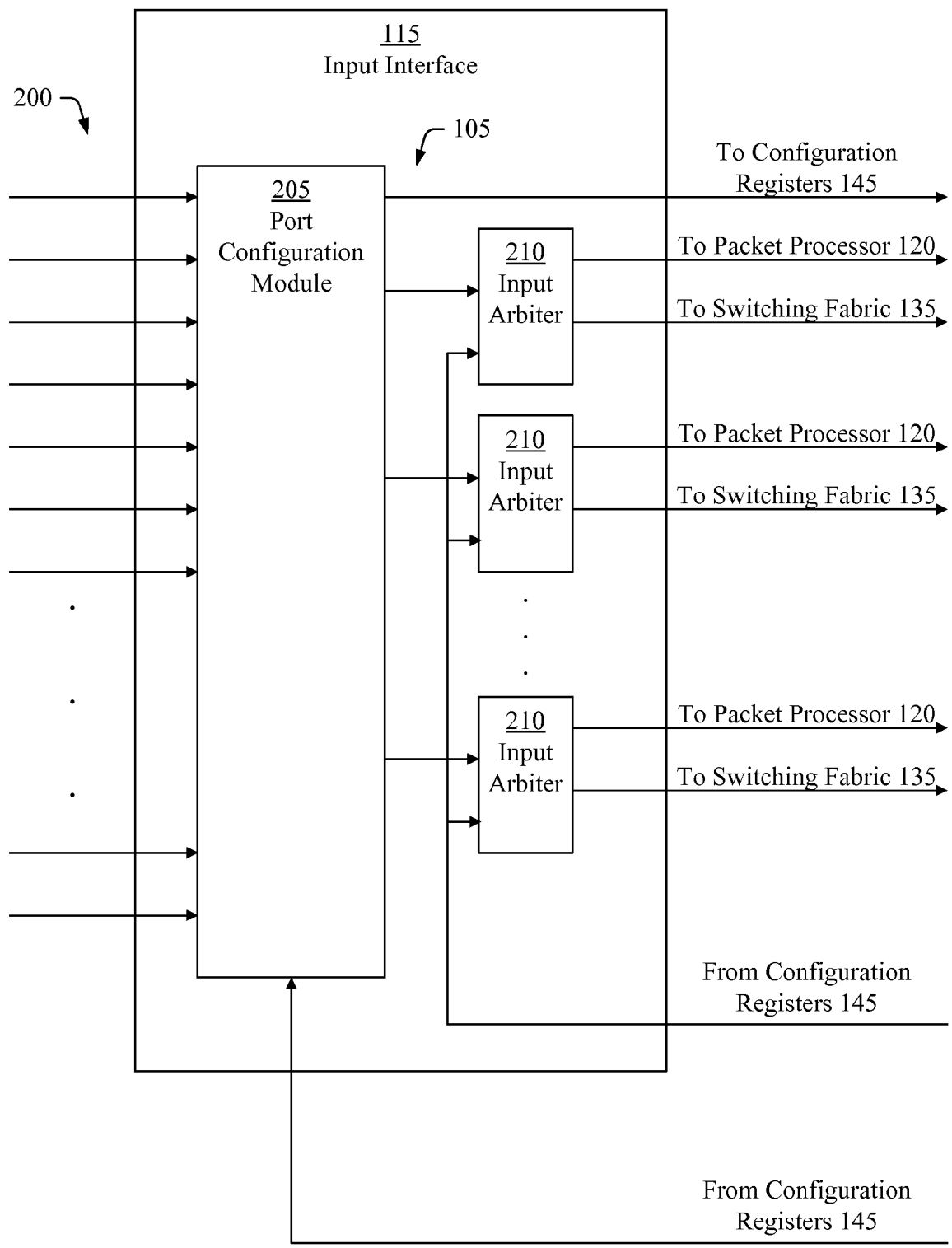
FIG. 2 is a block diagram of an input interface, in accordance with an embodiment of the present invention.

FIG. 2 illustrates the input interface 115, in accordance with an embodiment of the present invention. The input interface 115 includes a port configuration module 205 and input arbiters 210. In this embodiment, the packet switch 100 (FIG. 1) includes input links 200 coupled to the input interface 115, and the input ports 105 are internal of the packet switch 100. The port configuration module 205 is coupled to the input ports 105 and associates at least some of the input links 200 to at least some of the input ports 105. The input arbiters 210 are coupled to and associated with respective input ports 105.

The port configuration module 205 receives a data packet from an external source of the packet switch 100 at an input link 200 and passes the data packet to the input port 105 associated with the input link 200. In turn, the input arbiter 210 routes the data packet to the packet processor 120 (FIG. 1) or the switching fabric 135 (FIG. 1) based on the content of the data packet. In some embodiments, the port configuration module 205 is coupled to the configuration registers 145 (FIG. 1) through one of the input ports 105. In this way, an external source of the packet switch 100 (FIG. 1) can write configuration data into the configuration registers 145.

In various embodiments, the port configuration module 205 or the input arbiters 210, or both, are coupled to the configuration registers 145 (FIG. 1). In these embodiments, the configuration registers 145 can configure the port configuration module 205 or the input arbiters 210. The configuration registers 145 can configure the port configuration module 205 to associate input links 200 to input ports 105. Further, the configuration registers 145 can configure the input arbiters 210 to identify a data packet associated with a packet processing scenario, for example based on a destination identifier in the data packet.

In some embodiments, the port configuration module 205 can associate one input link 200 to one input port 105, or the port configuration module 205 can associate multiple input links 200 to a single input port 105. In one embodiment, the input links 200 are contained in groups of input links 200 and the input ports 105 are contained in groups of input ports 105. For example, each group of input links 200 may include four input links 200, and each group of input ports 105 may include four input ports 105. The port configuration module 205 associates one or more input links 200 in a group of input links 200 with one or more input ports 105 in an associated group of input ports 105. The port configuration module 205 can associate each input link 200 in the group of input links 200 with a respective input port 105 in the group of input ports 105. Instead, the port configuration module 205 can associate one input link 200 in the group of input links 200 with one input port 105 in the group of input ports 105 such that any remaining input link 200 in the group of input links 200 is not associated with an input port 105. Alternatively, the port configuration module 205 can associate all the input links 200 in the group of input links 200 with a single input port 105 in the group of input ports 200 such that any remaining input port 105 in the group of input ports 105 is not associated with an input link 200. Other associations between the group of input links 200 and the group of input ports 105 are possible.

Figure 3:
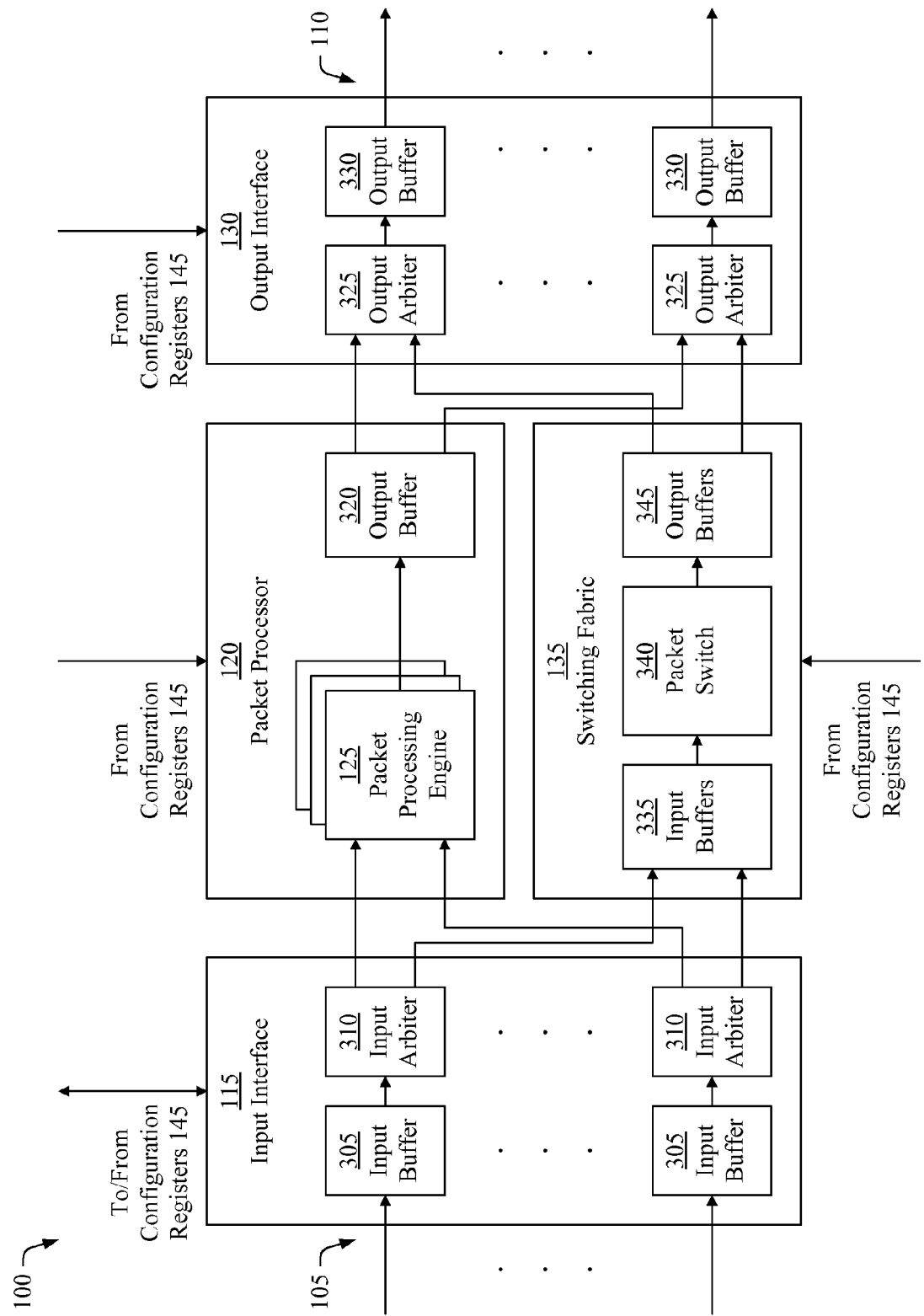
FIG. 3 is a block diagram of portions of a packet switch, in accordance with an embodiment of the present invention.

FIG. 3 illustrates portions of the packet switch 100, in accordance with an embodiment of the present invention. The input interface 115 includes input buffers 305 and input arbiters 310. Each of the input buffers 305 is coupled to and associated with one of the input ports 105 and one of the input arbiters 310. Additionally, each of the input arbiters 310 is coupled to the packet processor 120 and the switching fabric 135. The input buffer 305 receives data packets at the input port 105 associated with the input buffer 305 and passes the data packets to the arbiter 310 associated with the input buffer 305. In turn, the input arbiter 310 routes each of the data packets received from the input buffer 305 to either the packet processor 120 or the switching fabric 135 based on the content of the data packet. The input buffer 305 may include a First-In-First-Out (FIFO) queue for storing the data packets received at the input port 105. The input arbiter 310 may include a demultiplexer or a packet switch for routing the data packets to the packet processor 120 or the switching fabric 135.

The output interface 130 includes output arbiters 325 and output buffers 330. Each of the output buffers 330 is coupled to and associated with one of the output arbiters 325. Additionally, each of the output buffers 330 is coupled to and associated with one of the output ports 110. The output arbiter 325 receives data packets from the packet processor 120 and the switching fabric 135, and passes the data packets to the output buffer 330 associated with the output arbiter 325. Additionally, the output arbiter 325 may include one or more data buffers for storing the data packets received from the packet processor 120 and the switching fabric 135. Further, the output arbiter 325 may determine an order for passing the data packets stored in the output arbiter 325 to the output buffer 330, for example by using a round robin algorithm. The output arbiter 325 may include a multiplexer or a packet switch for passing data packets from the packet processor 120 and the switching fabric 135 to the output buffer 330. The output buffer 330 provides the data packets to the output port 110 associated with the output buffer 330 and may transmit the data packets to an external recipient of the packet switch 100. The output buffer 330 may include a FIFO queue for storing the data packets received from the output arbiter 325 associated with the output buffer 330.

The packet processor 120 includes the packet processing engines 125 and an output buffer 320. Each packet processing engine 125 is coupled to the input arbiters 310. The output buffer 320 is coupled to the packet processing engines 125 and to the output arbiters 325 of the output interface 130. The packet processing engines 125 receive data packets from the input arbiters 310 and generate data packets based on the data packets received from the input arbiters 310. The packet processing engines 125 write the generated data packets into the output buffer 320 based on packet processing scenarios. For example, a packet processing engine 125 can write a data packet into the output buffer 320 based on configuration data defining a packet processing scenario in the configuration registers 145 (FIG. 1). Further, the output buffer 320 provides the data packets received from the packet processing engines 125 to the output arbiters 325 based on the configuration data in the configuration registers 145.

In one embodiment, the output buffer 320 can store two data packets. In this way, a packet processing engine 125 can write a data packet into the output buffer 320 while the output buffer 320 routes another data packet, which is contained in the output buffer 320, to one of the output arbiters 325. In other embodiments, the output buffer 320 can store more or fewer data packets.

In one embodiment, the input interface 115 receives at an input port 305 one or more data packets associated with a packet processing scenario and one or more data packets not associated with any packet processing scenario. The input interface 115 routes any data packet associated with the packet processing scenario to the packet processor 120 in the order in which the data packets are received by the input interface 115. Similarly, the input interface 115 routes any received data packet not associated with a packet processing scenario to the switching fabric 135 in the order the data packets are received by the input interface 115. Moreover, the input interface 115 can route the data packets not associated with a packet processing scenario to the switching fabric 135 while the packet processing engine 120 performs the packet processing scenario on the data packets received from the input interface 115. In this way, the input interface 115 can route data packets to the switching fabric 135 between accumulation periods of the packet processing scenario.

The switching fabric 135 includes input buffers 335, a packet switch 340, and output buffers 345. The input buffers 335 are coupled to the input arbiters 310 of the input interface 115 and the packet switch 340. The output buffers 345 are coupled to the packet switch 340 and the output arbiters 325 of the output interface 130. Moreover, each output buffer 345 is associated with one of the output arbiters 325. The packet switch 340 routes data packets received by the input buffers 335 to the output buffers 345 based on the content of the data packets. For example, the packet switch 340 can route a data packet from an input buffer 335 to an output buffer 345 based on a destination identifier in the data packet. The output buffer 345 provides the data packet to the output arbiter 325 associated with the output buffer 345.

In one embodiment, the input arbiters 310 provide data packets received from the input buffers 305 of the input interface 115 to the input buffers 335 of the switching fabric 135 according to priorities of the data packets. For example, the data packets received by the input buffers 335 may be RapidIO™ packets that include a priority. Moreover, each input buffer 335 may be configured to receive data packets based on a priority of the data packets. For example, the configuration registers 145 (FIG. 1) can be configured such that an input buffer 335 receives data packets having a selected RapidIO™ priority level (e.g., priority level 0, 1, 2 or 3).

Figure 4:
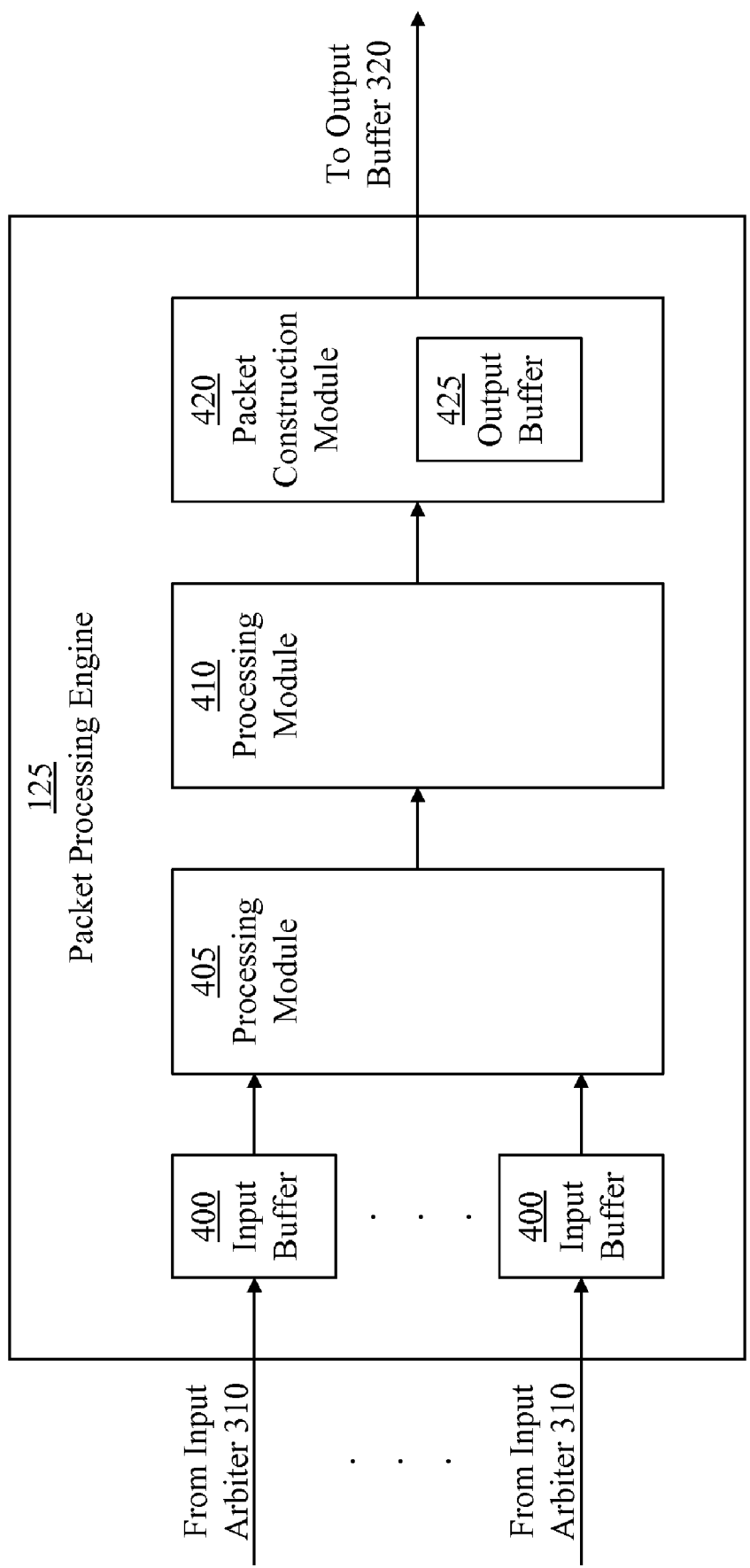
FIG. 4 is a block diagram of a packet processing engine, in accordance with an embodiment of the present invention.

FIG. 4 illustrates the packet processing engine 125, in accordance with an embodiment of the present invention. The packet processing engine 125 includes input buffers 400, a processing module 405, a processing module 410, and a packet construction module 420. Each of the input buffers 400 is coupled to one of the input arbiters 310 (FIG. 3) and to the processing module 405. Additionally, the processing module 405 is coupled to the processing module 410. The packet construction module 420 is coupled to the processing module 410 and the output buffer 320 (FIG. 3) of the packet processor 120.

The input buffers 400 receive data packets from the corresponding input arbiters 310 (FIG. 3). The processing module 405 reads the data packets in the input buffers 400 and performs one or more operations on the data packets according to a packet processing scenario. The operations of the packet processing scenario may include identifying data portions of the data payload in the data packet, increasing (padding) or decreasing the number of bits in one or more of the data portions, flipping the order of data bits in the data portions, and/or flipping the order of the data portions. The processing module 405 then provides the data portions to the processing module 410.

The processing module 410 can perform operations on the data portions received from the processing module 405 according to the packet processing scenario before providing the data portions to the packet construction module 420. The packet construction module 420 includes a data buffer 425 for storing the data portions received from the processing module 405. In one embodiment, the processing module 410 queues the data portions received from the processing module 405 and provides the data portions to the packet construction module 420 in the order the data portions are received from the processing module 405 (e.g., in a first-in-first-out order). The packet construction module 420 constructs a data packet based on the data portions received from the processing module 410. Additionally, the packet construction module 420 provides the constructed data packet to the output buffer 320 (FIG. 3). For example, the packet construction module 420 can provide the constructed data packet to the output buffer 320 based on a register in the packet processing engine 125 (FIG. 1) containing configuration data for a packet processing scenario. In other embodiments, the packet construction module 420 can construct multiple data packets based on the data portions received from the processing module 410. Although two processing modules 405 and 410 are illustrated in FIG. 4, the packet processing engine 125 may have more or fewer processing modules 405 or 410 arranged in other configurations.

A data packet received by the packet processing engine 125 may include a data payload including an imaginary data portion (I) and a quadrature data portion (Q). The processing modules 405 or 410 may extend/truncate these data portions, reorder these data portions, or reorder data bits in these data portions. For example, the data payload of the data packet may include an imaginary data portion (I) including four data bits ($I_0$ $I_1$ $I_2$ $I_3$) followed by a quadrature data portion (Q) including four data bits ($Q_0$ $Q_1$ $Q_2$ $Q_3$). Example operations of a packet processing scenario performed on exemplary data portions are described below. The processing module 405 or 410 may sign extend the least significant data bits in data portions as follows:

| Input data portions: | $I_0$ $I_1$ $I_2$ $I_3$ $Q_0$ $Q_1$ $Q_2$ $Q_3$ |
|---|---|
| Output data portions: | $I_1$ $I_2$ $I_3$ $I_3$ $I_3$ $Q_0$ $Q_1$ $Q_2$ $Q_3$ $Q_3$ $Q_3$ |

The processing module 405 or 410 may sign extend the most significant data bits in data portions as follows:

| Input data portions: | $I_0$ $I_1$ $I_2$ $I_3$ $Q_0$ $Q_1$ $Q_2$ $Q_3$ |
|---|---|
| Output data portions: | $I_0$ $I_0$ $I_0$ $I_1$ $I_2$ $I_3$ $Q_0$ $Q_0$ $Q_0$ $Q_1$ $Q_2$ $Q_3$ |

The processing module 405 or 410 may flip the data bits in data portions as follows:

| Input data portions: | $I_0$ $I_1$ $I_2$ $I_3$ $Q_0$ $Q_1$ $Q_2$ $Q_3$ |
|---|---|
| Output data portions: | $I_3$ $I_2$ $I_1$ $I_0$ $Q_3$ $Q_2$ $Q_1$ $Q_0$ |

The processing module 405 or 410 may reorder data portions as follows:

| Input data portions: | $I_0$ $I_1$ $I_2$ $I_3$ $Q_0$ $Q_1$ $Q_2$ $Q_3$ |
|---|---|
| Output data portions: | $Q_0$ $Q_1$ $Q_2$ $Q_3$ $I_0$ $I_1$ $I_2$ $I_3$ |

The processing module 405 or 410 may interleave data bits of data portions as follows:

| Input data portions: | $I_0$ $I_1$ $I_2$ $I_3$ $Q_0$ $Q_1$ $Q_2$ $Q_3$ |
|---|---|
| Output data portions: | $I_0$ $Q_0$ $I_1$ $Q_1$ $I_2$ $Q_2$ $I_3$ $Q_3$ |

The processing module 405 or 410 may perform post dynamic ranging on data bits of data portions as follows:

| Input data portions: | $I_0$ $I_1$ $I_2$ $I_3$ $I_4$ $I_5$ $I_6$ $I_7$ $Q_0$ $Q_1$ $Q_2$ $Q_3$ $Q_4$ $Q_5$ $Q_6$ $Q_7$ |
|---|---|
| Output data portions: | $I_4$ $I_5$ $I_6$ $I_7$ $Q_4$ $Q_5$ $Q_6$ $Q_7$ |

The processing modules 405 and 410 may sum data portions as follows:

| Input data portions: | $I_{00}$ $Q_{00}$ $I_{01}$ $Q_{01}$ $I_{02}$ $Q_{02}$ $I_{03}$ $Q_{03}$ |
|---|---|
| | $I_{10}$ $Q_{10}$ $I_{11}$ $Q_{11}$ $I_{12}$ $Q_{12}$ $I_{13}$ $Q_{13}$ |
| Output data portions: | $I_{R0}$ $Q_{R0}$ $I_{R1}$ $Q_{R1}$ $I_{R2}$ $Q_{R2}$ $I_{R3}$ $Q_{R3}$ | where $I_{Ri}=I_{0i}+I_{1i}$ and $Q_{Ri}=Q_{0i}+Q_{1i}$, for i=0 to 3

The processing modules 405 or 410 may perform a sequence of operations on the data portions (I and Q) according to the packet processing scenario. For example, assuming that input data portions have an IQ format, are IQ interleaved, and each of the I and Q data portions has 6 bits, the processing modules 405 or 410 may perform the following sequence of operations to produce an interleaved, IQ-flipped, sign-extended output.

| Input: | $I_0$ $Q_0$ $I_1$ $Q_1$ $I_2$ $Q_2$ $I_3$ $Q_3$ $I_4$ $Q_4$ $I_5$ $Q_5$ |
|---|---|
| Deinterleave I and Q: | $I_0$ $I_1$ $I_2$ $I_3$ $I_4$ $I_5$ $Q_0$ $Q_1$ $Q_2$ $Q_3$ $Q_4$ $Q_5$ |
| Sign extend LSB to 8 bits: | $I_0$ $I_1$ $I_2$ $I_3$ $I_4$ $I_5$ $I_5$ $Q_0$ $Q_1$ $Q_2$ $Q_3$ $Q_4$ $Q_5$ $Q_5$ $Q_5$ |
| Flip: | $I_5$ $I_5$ $I_5$ $I_4$ $I_3$ $I_2$ $I_1$ $I_0$ $Q_5$ $Q_5$ $Q_5$ $Q_4$ $Q_3$ $Q_2$ $Q_1$ $Q_0$ |
| Change IQ order: | $Q_5$ $Q_5$ $Q_5$ $Q_4$ $Q_3$ $Q_2$ $Q_1$ $Q_0$ $I_5$ $I_5$ $I_5$ $I_4$ $I_3$ $I_2$ $I_1$ $I_0$ |
| IQ Output Interleave: | $Q_5$ $I_5$ $Q_5$ $I_5$ $Q_5$ $I_5$ $Q_4$ $I_4$ $Q_3$ $I_3$ $Q_2$ $I_2$ $Q_1$ $I_1$ $Q_0$ $I_0$ |

In other embodiments, the packet processing engine 125 can perform other operations according to the packet processing scenario. For example, the packet processing scenario may include summing or other arithmetic operations on data payloads from multiple data packets.

Figure 5:
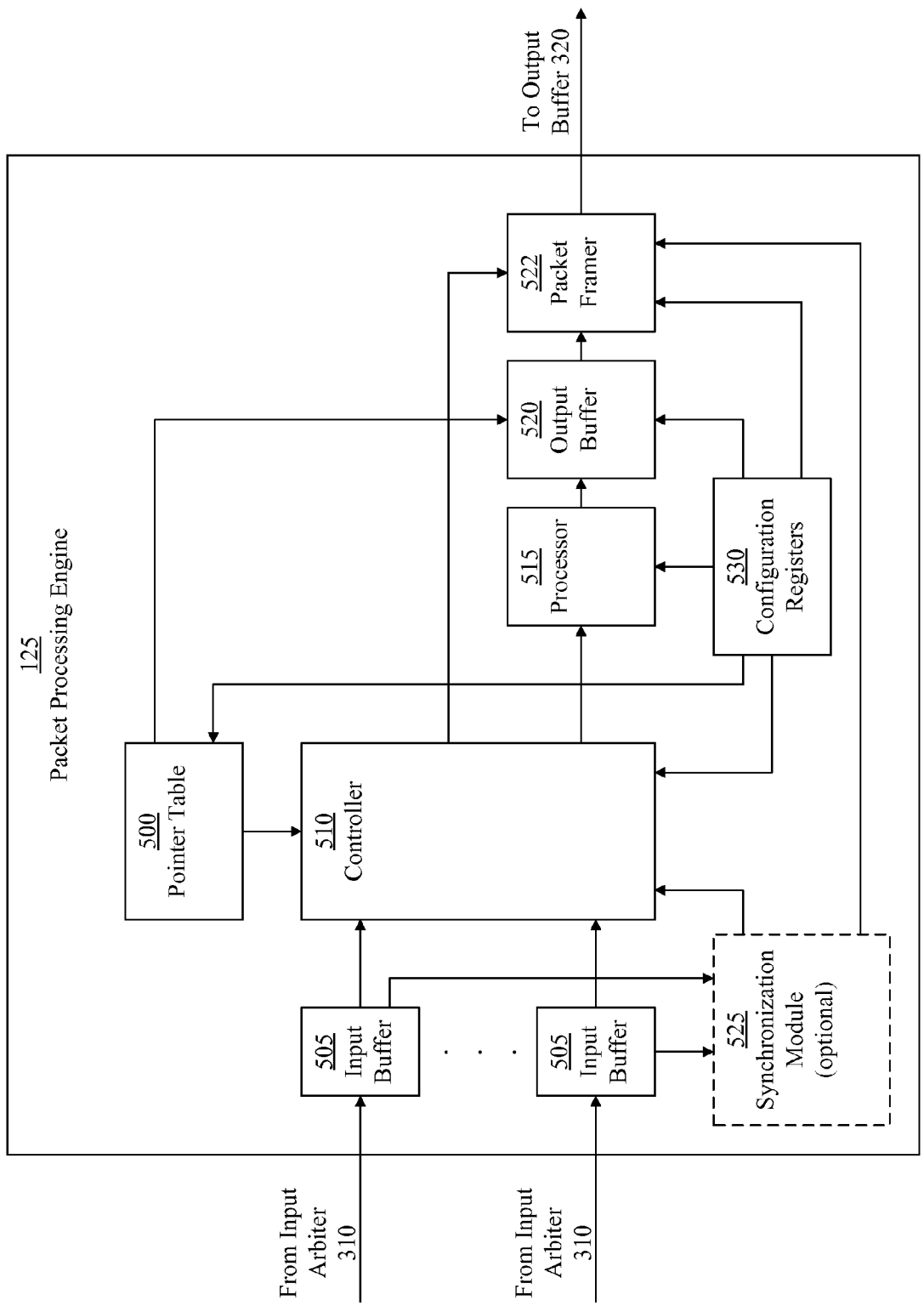
FIG. 5 is a block diagram of a packet processing engine, in accordance with an embodiment of the present invention.

FIG. 5 illustrates the packet processing engine 125, in accordance with another embodiment of the present invention. The packet processing engine 125 includes a pointer table 500, input buffers 505, a controller 510, a processor 515, an output buffer 520, a packet framer 522, and configuration registers 530. The input buffers 505 are data buffers coupled to corresponding input arbiters 310 (FIG. 3) and to the controller 510. The pointer table 500 is coupled to the controller 510 and the output buffer 520. The processor 515 is coupled to the controller 510 and the output buffer 520. The packet framer 522 is coupled to the output buffer 520 and to the output buffer 320 (FIG. 3) of the packet processor 120. The configuration registers 530 are coupled to the pointer table 500, the controller 510, the processor 515, the output buffer 520, and the packet framer 522.

The input buffer 505 receives data packets from the input arbiters 310 (FIG. 3). The pointer table 500 associates input data locations in the input buffer 505 to output data locations in the output buffer 520 according to a packet processing scenario defined by configuration data stored in the configuration registers 530. The pointer table 500 may be, for example, a data memory or a data structure for storing pointers, each of which maps an input location in the input buffer 505 to an output location in the output buffer 520. The input locations in the input buffer 505 can each store one or more data portions of a data packet. The output locations in the output buffer 520 can each store one or more data portions of an output data packet (i.e., a data packet generated by the packet processing engine 125). In this way, the pointer table 500 can map data portions in the input buffer 505 to data portions in the output buffer 520, for example to reorder the data portions. In one embodiment, each input buffer 505 can store two data packets. In this way, the input buffer 505 can receive a data packet from an input arbiter 310 while the controller 510 reads another data packet stored in the input buffer 505. In other embodiments, the input buffer 505 can store more or fewer data packets.

The controller 510 reads data portions in the input buffers 505 based on the pointer table 500 and provides the data portions to the processor 515. In turn, the processor 515 performs one or more operations on the data portions according to the packet processing scenario and provides the data portions to the output buffer 520. Additionally, the controller 510 identifies header information in the data packets and provides the header information to the packet framer 522. In turn, the packet framer 522 uses the header information to generate a header for the generated data packet. For example, the packet framer 522 may use a destination address in the header to determine a destination address for a generated data packet. The packet framer 522 receives the data portions from the output buffer 520 and the header information from the controller 510, generates a data packet based on the pointer table 500, the data portions, and the header information, and provides generated data packet to the output buffer 320 (FIG. 3). In one embodiment, the processor 515 includes the controller 510.

In some embodiments, the packet framer 522 generates multiple data packets based on the data portions received from the output buffer 520. The data packets include the same destination identifier but each of the data packets may include a unique destination address. The packet framer 522 can generate the destination addresses for the data packets, for example, based on a destination address received from the controller 510 (FIG. 5) or based on a start address and address offset stored in the configuration registers 145 (FIG. 1). In one embodiment, the packet framer 522 can generate the destination addresses based on a stop address stored in the configuration registers 145. In this embodiment, a first destination address is the start address and a subsequent destination address is determined by adding the address offset to the previous destination address until the stop address is reached. The next destination address then wraps around to the start address.

In one embodiment, the packet processing engine 125 uses dynamic packet accumulation to accumulate data packets in the input buffers 505 before processing the data packets according to a packet processing scenario. The packet processing engine 125 accumulates the data packets in the input buffers 505 within an accumulation period before processing the data packets according to the packet processing scenario. The packet processing engine 125 may start the accumulation period at the arrival time of a first data packet to be processed according to the packet processing scenario. If a data packet required for a packet processing scenario arrives after the accumulation period, the packet processing engine 125 replaces the data packet with a default data packet having a default data payload. For example, the default data payload may include data bits each having a value of zero. As another example, the default data payload may include data bits each having a value of one. The packet processing engine 125 processes the data packets received within the accumulation period, including any replacement data packets, to generate one or more data packets. Further, the packet processing engine 125 provides each generated data packet to the output buffer 320 (FIG. 3) of the packet processor 120.

The dynamic packet accumulation process described above can provide significant flexibility in system synchronization of the packet switch 100. According to some embodiments of the present invention, the packet processing engine 125 starts an accumulation period for a packet processing scenario when a first data packet associated with the packet processing scenario is received by the packet processing engine 125. This allows for initialization of the packet processing engine 125 before bringing up transmitters connected to the packet switch 100 because each packet processing scenario is performed after the packet processing engine 125 begins receiving data packets.

In one embodiment, the packet processing engine 125 can generate an initialization signal to start the accumulation period of a packet processing scenario. In another embodiment, the packet processor 120 can generate an initialization signal for multiple packet processing scenarios, such as a group packet processing scenario, to start the accumulation period for the multiple packet processing scenarios at substantially the same time.

In one embodiment, the packet processor 120 performs packet processing scenarios in a time-division multiplexed (TDM) mode of operation. In this embodiment, an accumulation period is selected such that each packet processing scenario can be processed within the accumulation period. For example, the accumulation period can be the longest processing time among packet processing scenarios performed by the packet processor 120. Further, the packet processor 120 may be configured to transmit the data packets generated by the packet processing engines 125 in the accumulation period to the output interface 130 in parallel. For example, the packet switch 100 may initiate transmission of the data packets generated in an accumulation period at the start of a subsequent accumulation period.

In a further embodiment, the packet processing engine 125 includes an optional synchronization module 525 coupled to the input buffer 505, the controller 510, and the packet framer 522. The synchronization module 525 monitors the timing of the data packets received at the input buffer 505 and provides timing information to the controller 510. The controller 510 uses the timing information, for example, to determine an accumulation period for a packet processing scenario. Additionally, the synchronization module 525 can provide timing information to the packet framer 522 for the time-division multiplexed mode of operation.

In one embodiment, the configuration registers 145 (FIG. 1) of the packet switch 100 (FIG. 1) include the configuration registers 530 of the packet processing engine 125. In this embodiment, the configuration registers 530 are user-configurable through the communication interface 150 or the input interface 115. In this way, a user can configure the packet processing scenario performed by the packet processing engine 125.

Figure 6:
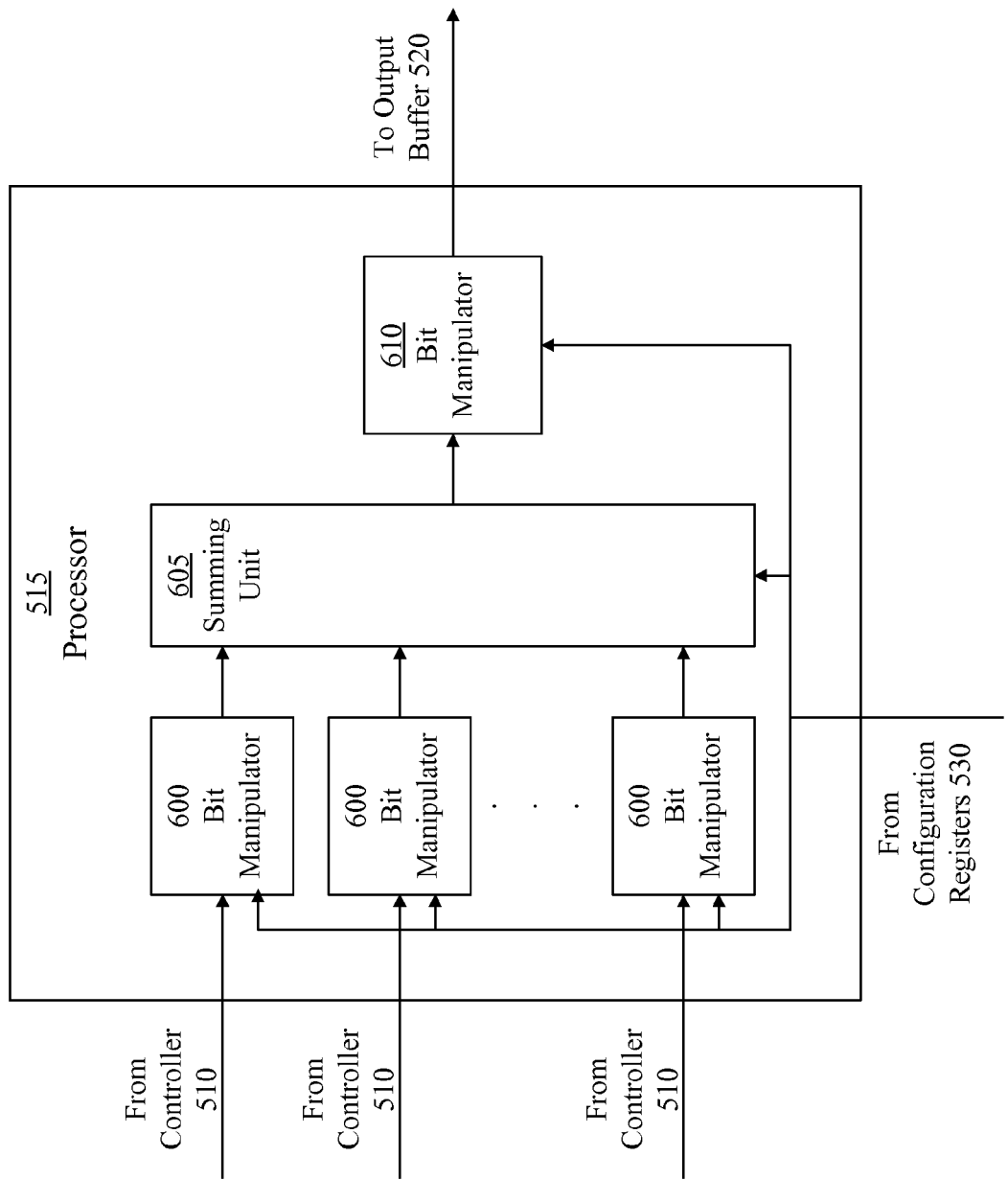
FIG. 6 is a block diagram of a processor, in accordance with an embodiment of the present invention.

FIG. 6 illustrates the processor 515, in accordance with an embodiment of the present invention. The processor 515 includes bit manipulators 600, a summing unit 605, and a bit manipulator 610. The bit manipulators 600 are each coupled to the controller 510 (FIG. 5) and to the summing unit 605. The bit manipulator 610 is coupled to the summing unit 605 and the output buffer 520 (FIG. 5). Additionally, the bit manipulators 600, the summing unit 605, and the bit manipulator 610 are each coupled to the configuration registers 530 (FIG. 5). The configuration registers 530 store configuration data for configuring the bit manipulators 600, the summing unit 605, and the bit manipulator 610 to perform a packet processing scenario.

The bit manipulators 600 each perform operations on data portions received from the controller 510 (FIG. 5) according to the packet processing scenario defined by configuration data stored in the configuration registers 530 (FIG. 5). For example, the bit manipulators 600 can perform deinterleaving, sign extension, truncation, and/or dynamic ranging operations on the data portions. The summing unit 605 performs summation operations on data portions received from the bit manipulators 600 according to the packet processing scenario. Additionally, the summing unit 605 can perform dynamic/saturation ranging on the data portions.

The bit manipulator 610 performs flipping (e.g., MSB/LSB), IQ ordering, and/or IQ interleaving operations on the data portions received from the summing unit 605 according to the packet processing scenario. Additionally, the bit manipulator 610 can perform masking operations on the data portions. The bit manipulator 610 provides the processed data portions to the output buffer 520 (FIG. 5).

Figure 7:
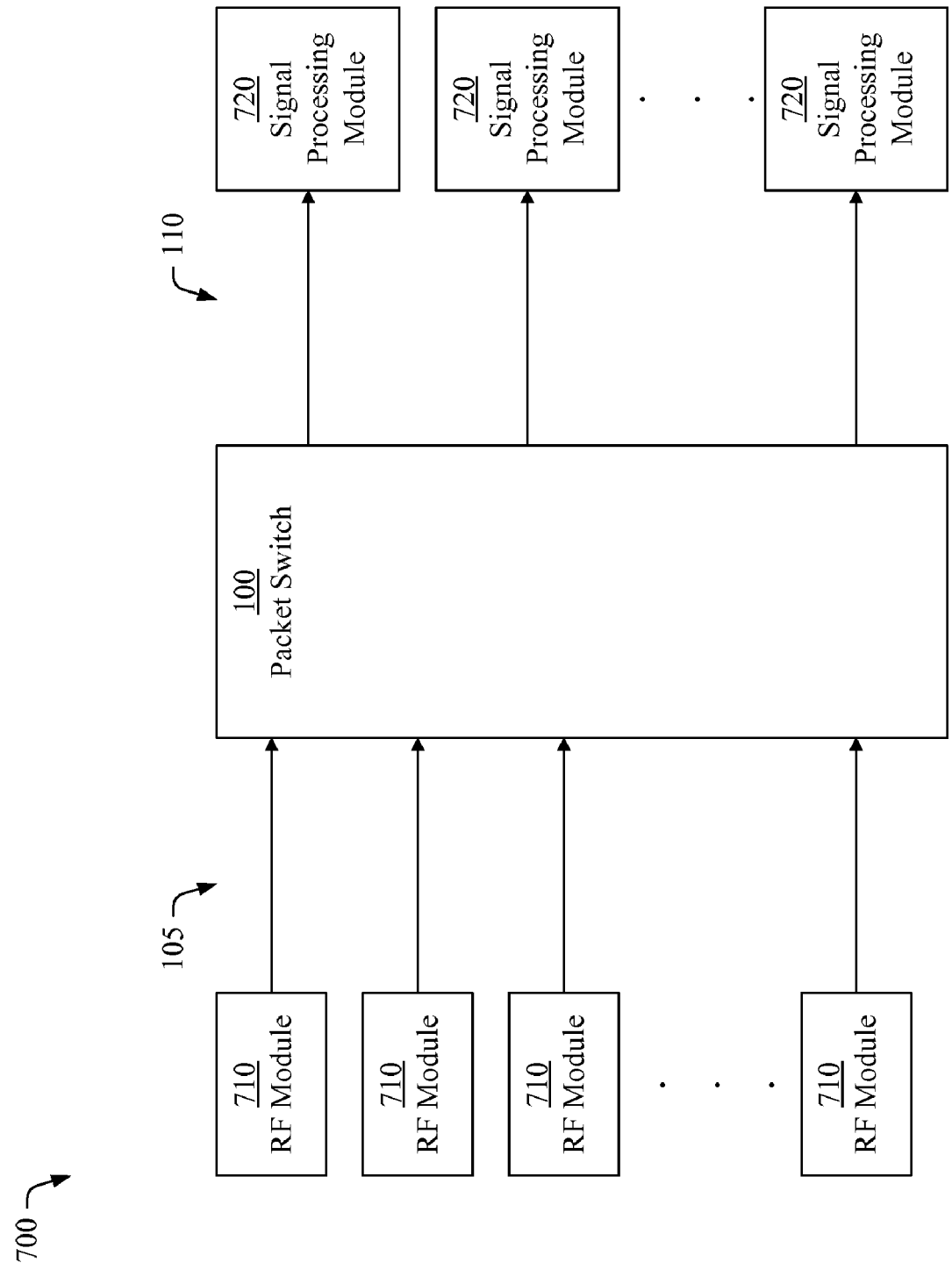
FIG. 7 is a block diagram of a base station containing a packet switch, in accordance with an embodiment of the present invention.

FIG. 7 illustrates the packet switch 100, in accordance with another embodiment of the present invention. As illustrated, the packet switch 100 is contained in an exemplary wireless base station 700. The wireless base station 700 includes radio-frequency (RF) modules 710 coupled in communication with respective input ports 105 of the packet switch 100. For example, the RF module 710 can be an RF card including an RF receiver. The packet switch 100 receives data packets from the RF modules 710 at the input ports 105. The data packets contain data payloads for communications received by the RF modules 710. For example, the data payloads may include digital representations of radio signals received by the RF modules 710.

The wireless base station 700 further includes signal processing modules 720 coupled to respective output ports 110 of the packet switch 100. For example, the signal processing modules 720 can be digital signal processors (DSPs) or chip rate processors (CRPs). The signal processing modules 720 receive data packets from the packet switch 100 and perform operations, such as baseband processing functions, on the data payloads contained in the data packets. For example, the signal processing modules 720 can demodulate and decode the data portions of the data payloads to reproduce a radio signal.

The packet switch 100 receives data packets from the RF modules 710 and can perform packet processing scenarios on the data packets to facilitate operations performed on the data packets by the signal processing modules 720. In this way, the packet switch 100 may reduce the processing load of the signal processing modules 720 and improve the performance of the base station 700.

Figure 8:
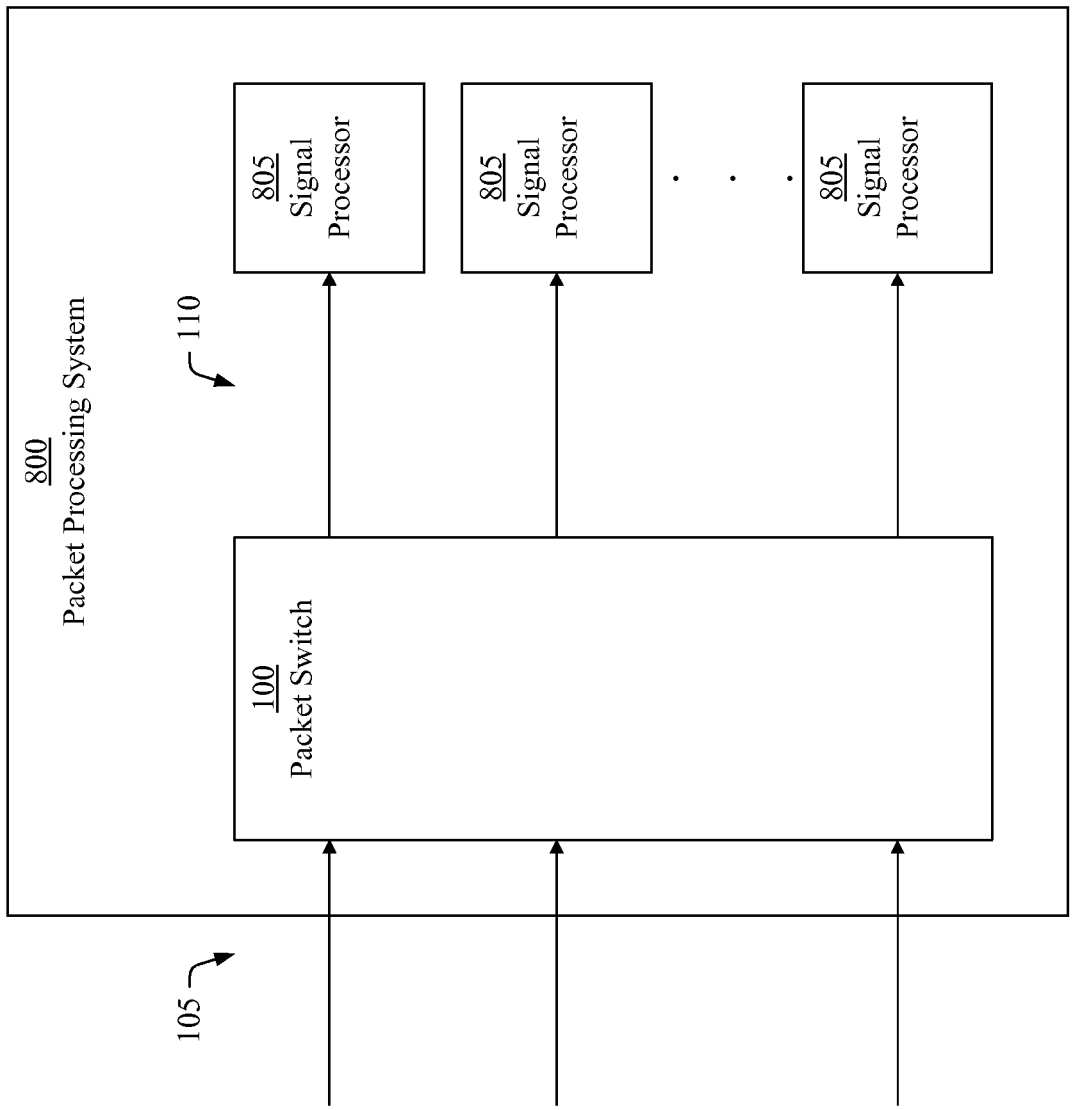
FIG. 8 is a block diagram of a packet processing system, in accordance with an embodiment of the present invention.

FIG. 8 illustrates a packet processing system 800, in accordance with an embodiment of the present invention. The packet processing system 800 includes the packet switch 100 and one or more signal processors 805. The signal processor 805 may be any system or device that processes data packets. For example, the signal processor 805 may include a digital signal processor for performing operations on data payloads of the data packets. Each of the signal processors 805 is coupled to a respective output port 110 of the packet switch 100. The packet switch 100 receives data packets at the input ports 105 and preprocesses the data packets according to one or more packet processing scenarios, as is described more fully herein. The packet switch 100 routes the preprocessed data packets to the signal processors 805, and the signal processors 805 further process the data packets. Thus, the packet switch 100 and the signal processors 805 cooperate with each other to process the data packets. Moreover, preprocessing the data packets in the packet switch 100 reduces the processing load of the signal processors 805, which may increase the performance and/or throughput of the packet processing system 800.

Figure 9A:
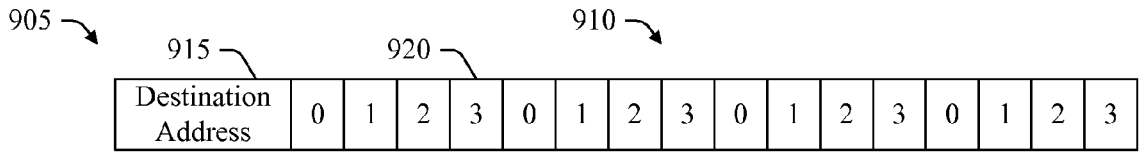
FIG. 9A is a block diagram of a data packet, in accordance with an embodiment of the present invention.
Figure 9B:
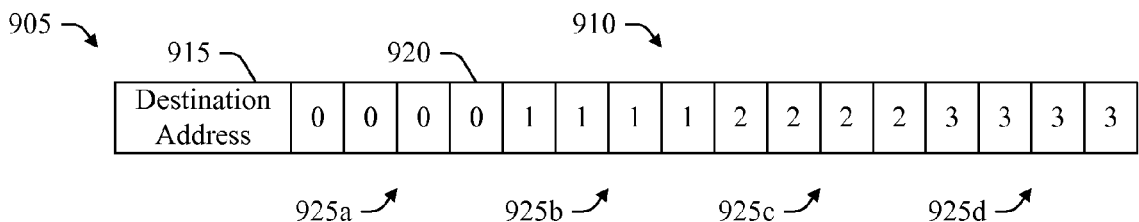
FIG. 9B is a block diagram of a data packet including data portions, in accordance with an embodiment of the present invention.
Figure 9C:
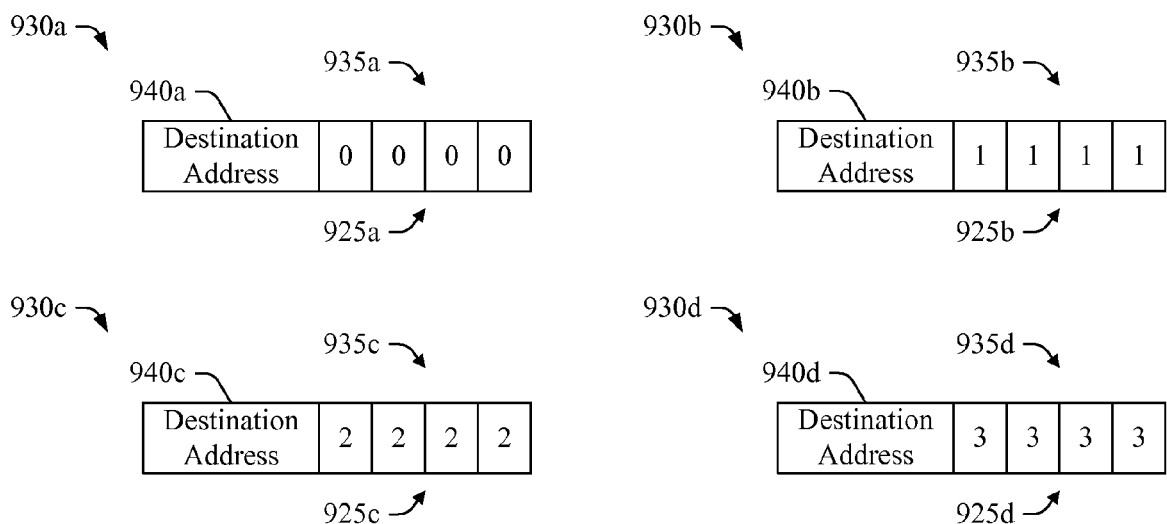
FIG. 9C is a block diagram of constructed data packets, in accordance with an embodiment of the present invention.

FIGS. 9A-C illustrates an output data distribution packet processing scenario, in accordance with an embodiment of the present invention. As illustrated in FIG. 9A, a packet processing engine 125 (FIG. 1) receives a data packet 905 including a destination address 915 and a data payload 910. The data payload 910 may include a sequence of data portions 920 from multiple data sources (e.g., data sources 0, 1, 2 and 3). For example, each data source can be a separate carrier of a radio frequency signal. As illustrated in FIG. 9B, the packet engine 125 may perform one or more data operations of the output data distribution packet processing scenario on the data payload 910 to separate the data portions 920 into data portions 925 (e.g., data portions 925*a-d*). In some cases, the data payload 910 is already separated into data portions 925 and the output data distribution packet processing scenario need not perform any operation on the data payload 910 to separate the data portions 925. As illustrated in FIGS. 9A and 9B, the data payload 910 includes data portions 920 from four data sources (e.g., data sources 0, 1, 2, and 3) and each data portion 925*a-d* includes the data portions 920 from one of the data sources. In other embodiments, the data payload 910 can include data portions 920 from more or fewer data sources.

As illustrated in FIG. 9C, the packet engine 125 (FIG. 1) identifies each data portion 925, determines a destination address 940 for the data portion 925, and constructs a data packet 930 for the data portion 925, based on the output data distribution packet processing scenario. The data packet 930 for the data portion 925 includes the destination address 940 of the data portion 925 and a data payload 935 including the data portion 925. In some embodiments, the packet engine 125 determines the destination addresses 940 such that each of the destination addresses 940 is unique. In other embodiments, the packet engine 125 can determine the destination addresses 940 such that some of the destination addresses 940 are the same.

As illustrated in FIG. 9C, the packet engine 125 (FIG. 1) constructs four data packets 930*a-d* corresponding to the four data portions 925*a-d*. The data packets 930*a-d* include corresponding destination addresses 940*a-d* and corresponding data payloads 935*a-d*, each of which includes one of the data portions 925*a-d*. Thus, the data payload 910 (FIG. 9B) of the data packet 905 (FIG. 9B) is distributed among the data packets 930*a-d*. In some embodiments, the data payloads 935*a-d* consist of the corresponding data portions 925*a-d*. In other embodiments, the packet engine 125 can construct more or fewer data packets 930.

In one embodiment, the packet engine 125 (FIG. 1) identifies a start address, an address offset, and a stop address for each constructed data packet 930 in the output data distribution packet processing scenario. For example, the configuration registers 145 (FIG. 1) can store a start address, an address offset, and a stop address for each of the constructed data packets 930*a-d* of the output data distribution packet processing scenario. The packet engine 125 determines the destination addresses 940*a-d* of the constructed data packets 930*a-d* in a first processing cycle of the packet processing scenario by setting the destination addresses 940*a-d* to corresponding start addresses. In a second processing cycle following the first processing cycle, the packet engine 125 determines the destination addresses 940*a-d* of the data packets 930*a-d* by summing each start address with a corresponding address offset. In this way, the destination addresses 940*a-d* of the data packets 930*a-d* in the first processing cycle and the destination addresses 940*a-d* of the data packets 930*a-d* in the second processing cycle are staggered by the address offsets. Similarly, the destination addresses 940*a-d* of data packets in succeeding processing cycles of the packet processing scenario are staggered by the address offsets until the destination addresses reach the stop addresses. The destination addresses 940*a-d* then wrap around to the start addresses in the next processing cycle.

The packet engine 125 (FIG. 1) routes each data packet 930 to the output buffer 320 (FIG. 3) of the packet processor 120 (FIG. 3), and the output buffer 320 routes the data packet to the appropriate output arbiters 325 (FIG. 3). In turn, the output interface 130 can transmit each data packet 930 to an external recipient. Although the destination addresses 940 may be unique, the output buffer 320 may route each of the data packets 930 to the same output arbiter 325 or each of the data packets 930 to multiple output arbiters 325. In one embodiment, the output interface 130 transmits each of the data packet 930 to one of the signal processors 805 (FIG. 8) of the packet processing system 800 (FIG. 8).

Figure 10:
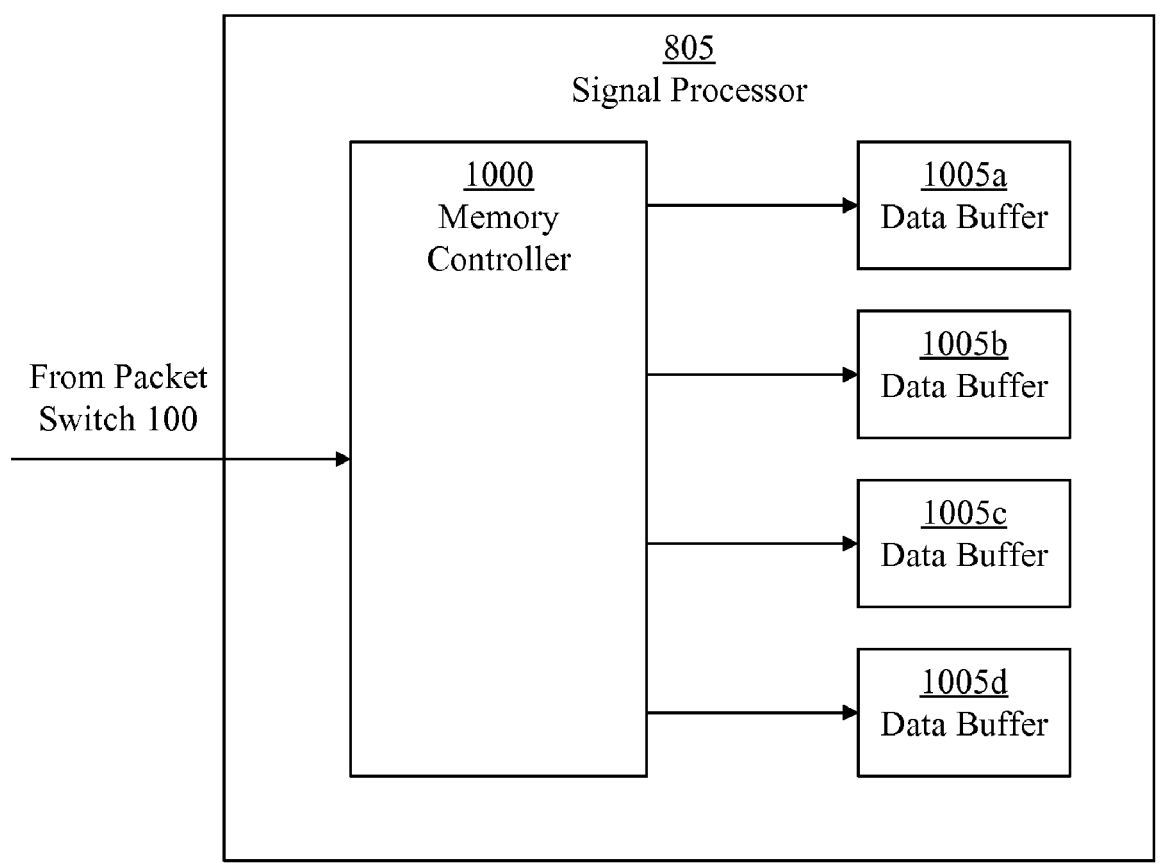
FIG. 10 is block diagram of a signal processor, in accordance with an embodiment of the present invention.

FIG. 10 illustrates the signal processor 805, in accordance with an embodiment of the present invention. The signal processor 805 includes a memory controller 1000 and data buffers 1005 coupled to the memory controller 1000. The data buffer 1005 can be a random access memory (RAM), a FIFO, data registers, or any other memory device for storing data. The memory controller 1000 receives data packets 930 (FIG. 9C) from the packet switch 100 (FIG. 1) and writes the data packets 930 into the data buffers 1005 based on the destination addresses 940 (FIG. 9C) of the data packets 930. As illustrated in FIG. 10, the signal processor 805 has four data buffers 1005*a-d*. Moreover, each of the destination addresses 940*a-d* identifies one of the respective data buffers 1005*a-d*. In other embodiments, the signal processor 805 can have more or fewer data buffers 1005.

In one embodiment, the packet engine 125 (FIG. 1) that performs the output data distribution packet processing scenario determines the destination addresses 940 (FIG. 9C) of the data packets 930 (FIG. 9C) such that the controller 1000 stores each of the data packets 930 into the data buffer 1005 identified by the destination address 940 of the data packet 930. In this way, each data buffer 1005 stores data packets 930 containing data payloads 935 (FIG. 9C) from the same data source (e.g., the same signal carrier). Moreover, the signal processor 805 can process data packets 930 containing data payloads 935 from the same data source by accessing the data packets 930 contained in the appropriate data buffer 1005. Because the packet switch 100 distributes the data payload 910 (FIG. 9B) of the data packet 905 (FIG. 9B) among the data packets 930*a-d* and determines the destination addresses 940*a-d* of the data packets 930*a-d*, the signal processor 805 need not perform these functions to tailor the processed data payload of the data packet to the memory structure of the signal processor 805. Further, because the format of the data packets output from the packet switch 100 conforms to the memory structure of the signal processor 805, this allows the signal processor 805 to process the data packets more quickly and efficiently. Thus, the packet switch 100 preprocesses the data packet 905 to generate the data packets 930*a-d*, which may reduce the processing load of the signal processor 805.

In one embodiment, the packet switch 100 (FIG. 1) and the signal processor 805 (FIG. 10) cooperate with each other to process the data packet 905 (FIG. 9A). The packet switch 100 preprocesses the data packet 905 to generate the data packets 930 (FIG. 9C), and the signal processor 805 further processes the data packet 905 by processing the data packets 930. For example, the packet switch 100 and the signal processor 805 together can process the data packet 905 by performing a baseband operation on the data packet 905. As another example, the data packet 905 may contain graphics data, such as pixels, and the packet switch 100 and the signal processor 805 together can process the data packet 905 by performing a graphics operation on the data packet 905. Moreover, the packet switch 100 can select the destination addresses 940 (FIG. 9C) of the data packets 930 based on addresses of the signal processor 805. For example, the signal processor 805 may include a range of addresses for receiving data packets. By preprocessing the data packet 905, the packet switch 100 can reduce the processing load of the signal processor 805, which may increase the throughput of the signal processor 805. In one embodiment, the packet switch 100 is contained in an integrated circuit and the signal processor 805 is contained in another integrated circuit. In a further embodiment, the packet switch 100 and the signal processor 805 are contained in the same integrated circuit.

Figure 11:
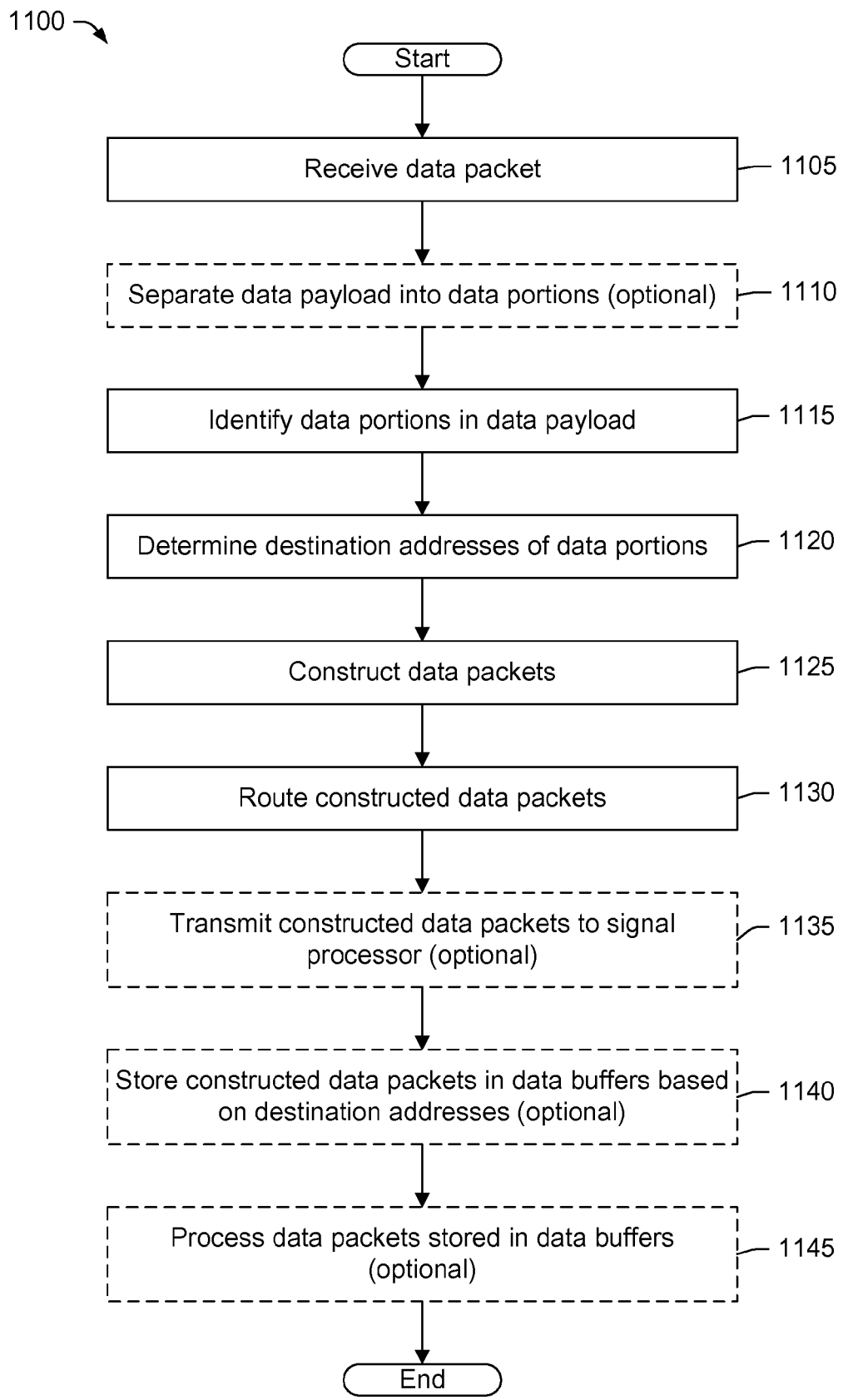
FIG. 11 is a flow chart for a method of processing a data packet, in accordance with an embodiment of the present invention.

FIG. 11 illustrates a method 1100 of processing a data packet, in accordance with an embodiment of the present invention. In step 1105, the packet switch 100 (FIG. 1) receives the data packet 905 (FIG. 9A). In one embodiment, the input interface 115 (FIG. 1) of the packet switch 100 receives the data packet 905 and determines that the data packet 905 is associated with an output data distribution packet processing scenario. The input interface 115 then routes the data packet 905 to the packet engine 125 (FIG. 1) of the packet processor 120 (FIG. 1) associated with the output data distribution packet processing scenario. The method 1100 then proceeds to step 1110.

In optional step 1110, the packet engine 125 (FIG. 1) performs a data operation on the data payload 910 (FIG. 9A) of the data packet 905 (FIG. 9A) to separate data portions 920 of the data payload 910 into data portions 925 (FIG. 9B). For example, the packet engine 125 can perform a deinterleave operation on the data payload 910 according to the output data distribution packet processing scenario. The method then proceeds to step 1115.

In step 1115, the packet engine 125 (FIG. 1) identifies the data portions 925 (FIG. 9B) in the data payload 910 (FIG. 9B). In one embodiment, the packet engine 125 identifies the data portions 925 based on the output data distribution packet processing scenario. The method 1100 then proceeds to step 1120.

In step 1120, the packet engine 125 (FIG. 1) determines the destination addresses 940 (FIG. 9C) corresponding to the data portions 925 (FIG. 9C). The destination addresses 940 may be unique addresses, each of which is the first address of a series of addresses beginning with a start address such that successive addresses in the series differ by an address offset. The packet engine 125 can determine the start address and the address offset according to the output data distribution packet processing scenario, for example by reading the start address and the address offset in the configuration registers 145 (FIG. 1). The method 1100 then proceeds to step 1125.

In step 1125, the packet engine 125 (FIG. 1) constructs the data packets 930 (FIG. 9C) including the data portions 925 (FIG. 9C). Each data packet 930 includes one of the destination addresses 940 (FIG. 9C) and a data payload 935 (FIG. 9C) including the data portion 925 (FIG. 9C) corresponding to the destination address 940. The method 1100 then proceeds to step 1130.

In step 1130, the packet engine 125 (FIG. 1) routes the constructed data packets 930 (FIG. 9C) to the output buffer 320 (FIG. 3) of the packet processor 120 (FIG. 3). In turn, the output buffer 320 routes the data packets 930 to the output arbiters 325 (FIG. 3) of the output interface 130 (FIG. 3). In one embodiment, the packet engine 125 routes the constructed data packets 930 to the output buffer 320 based on configuration data in the configuration registers 145 (FIG. 1). In another embodiment, the packet engine 125 routes the constructed data packets 930 to the output buffer 320 based on the destination identifiers of the constructed data packets 930. The method 1100 then proceeds to step 1135.

In optional step 1135, the packet switch 100 (FIG. 1) transmits the data packets 930 (FIG. 9C) to the signal processor 805 (FIG. 10). In one embodiment, the output interface 130 (FIG. 1) transmits the data packets 930 to the memory controller 1000 (FIG. 10) of the signal processor 805. The method 1100 then proceeds to step 1140.

In optional step 1140, the signal processor 805 (FIG. 10) stores the data packets 930 (FIG. 9C) in the data buffers 1005 (FIG. 10) based on the destination addresses 940 (FIG. 9C) of the data packets 930. In one embodiment, the destination addresses 940 of the data packets 930 identify corresponding data buffers 1005, and the memory controller 1000 (FIG. 10) of the signal processor 805 writes the data packets 930 into the corresponding data buffers 1005 identified by the destination addresses 940. In this way, data payloads 935 (FIG. 9C) from the same data source are stored in the same data buffer 1005. The method 1100 then proceeds to step 1145.

In optional step 1145, the signal processor 805 (FIG. 10) processes the data packets 930 (FIG. 9C) stored in the data buffers 1005 (FIG. 10). For example, the signal processor 805 can perform baseband operations or video processing operations on the data payloads 935 (FIG. 9C) of the data packets 930. The method 1100 then ends.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A method of processing a data packet in a packet switch, the method comprising:
   receiving a first data packet by the packet switch, the first data packet comprising a destination identifier and a data payload;
   identifying a first data portion in the data payload of the first data packet;
   identifying a second data portion in the data payload of the first data packet;
   performing a data operation on the data payload of the first data packet for separating the first data portion from the second data portion;
   determining a destination address for the first data portion;
   determining a destination address for the second data portion;
   constructing a second data packet comprising the destination address of the first data portion and a data payload comprising the first data portion but not the second data portion;
   constructing a third data packet comprising the destination address of the second data portion and a data payload comprising the second data portion but not the first data portion; and
   routing the second data packet based on a destination identifier of the first data packet; and
   routing the third data packet based on a destination identifier of the second data packet, wherein the destination identifier of the second data packet and the destination identifier of the third data packet are the same destination identifier.

2. The method of claim 1, wherein the data operation includes a deinterleave operation for deinterleaving the first data portion and the second data portion.

3. The method of claim 1, further comprising:
   transmitting the second data packet from the packet switch to a digital signal processor; and
   transmitting the third data packet from the packet switch to the digital signal processor.

4. The method of claim 1, further comprising:
   transmitting the second data packet from the packet switch to a digital signal processor;
   transmitting the third data packet from the packet switch to the digital signal processor,
   storing the second data packet in a first data buffer of the digital signal processor based on the destination address of the second data packet; and
   storing the third data packet in a second data buffer of the digital signal processor based on the destination address of the third data packet.

5. The method of claim 1, wherein the destination address of the second data packet and the destination address of the third data packet are unique.

6. The method of claim 1, wherein determining the destination address of the second data packet comprises determining a start address, the start address being the destination address of the second data packet.

7. The method of claim 6, further comprising determining an address offset, wherein determining the destination address of the third data packet comprises summing the address offset and the start address.

8. The method of claim 7, further comprising:
   identifying a third data portion in the data payload of the first data packet;
   determining a stop address;
   determining the destination address of the second data packet is the same as the stop address;
   determining a destination address of the third data portion, the destination address of the third data portion being the start address;
   constructing a fourth data packet comprising the destination address of the third data portion and a data payload comprising the third data portion; and
   routing the fourth data packet based on a destination identifier of the fourth data packet, wherein the destination identifier of the second data packet, the destination identifier of the third data packet and the destination identifier of the fourth data packet are the same destination identifier.

9. The method of claim 1, wherein the data payload of the second data packet consists of the first data portion, and the data payload of the third data packet consists of the second data portion.

10. A packet switch, comprising:
    an input interface configured to receive a first data packet comprising a destination identifier and a data payload; and
    a packet processor coupled to the input interface, the packet processor configured to identify a first data portion and a second data portion of the data payload of the first data packet, perform a data operation on the data payload of the first data packet for separating the first data portion from the second data portion, determine a destination address for each of the first data portion and the second data portion, construct a second data packet comprising the destination address of the first data portion and a data payload comprising the first data portion but not the second data portion, construct a third data packet comprising the destination address of the second data portion and a data payload comprising the second data portion but not the first data portion, route the second data packet based on a destination identifier of the second data packet, and route the third data packet based on a destination identifier of the third data packet, wherein the destination identifier of the second data packet and the destination identifier of the third data packet are the same destination identifier.

11. The packet switch of claim 10, wherein the packet processor is further configured to determine a start address and an address offset, the start address being the destination address of the second data packet, the packet processor further configured to determine the destination address of the third data packet by summing the address offset and the start address.

12. The packet switch of claim 10, wherein the data operation includes a deinterleave operation for deinterleaving the first data portion and the second data portion.

13. The packet switch of claim 10, further comprising an output interface coupled to the packet processor and a digital signal processor, the output interface configured to transmit the second data packet and the third data packet to the digital signal processor.

14. The packet switch of claim 13, wherein the digital signal processor comprises a first data buffer and a second data buffer, and wherein the digital signal processor is configured to store the second data packet in the first data buffer based on the destination address of the second data packet and to store the third data packet in the second data buffer based on the destination address of the third data packet.

15. The packet switch of claim 10, wherein the destination address of the second data packet and the destination address of the third data packet are unique.

16. The packet switch of claim 10, wherein the data payload of the second data packet consists of the first data portion, and the data payload of the third data packet consists of the second data portion.

17. A packet switch, comprising:
  means for receiving a first data packet comprising a destination identifier and a data payload;
  means for identifying a first data portion in the data payload of the first data packet;
  means for identifying a second data portion in the data payload of the first data packet;
  means for performing a data operation on the first data packet for separating the first data portion from the second data portion;
  means for determining a destination address for the first data portion;
  means for determining a destination address for the second data portion;
  means for constructing a second data packet comprising the destination address of the first data portion and a data payload comprising the first data portion but not the second data portion;
  means for constructing a third data packet comprising the destination address of the second data portion and a data payload comprising the second data portion but not the first data portion;
  means for routing the second data packet based on a destination identifier of the first data packet; and
  means for routing the third data packet based on a destination identifier of the second data packet, wherein the destination identifier of the second data packet and the destination identifier of the third data packet are the same destination identifier.

18. The packet switch of claim 17, further comprising:
  means for transmitting the second data packet to a digital signal processor coupled to the packet switch;
  means for transmitting the third data packet to the digital signal processor;
  means for storing the second data packet in the digital signal processor based on the destination address of the second data packet; and
  means for storing the third data packet in the digital signal processor based on the destination address of the third data packet.

19. The packet switch of claim 18, wherein the data payload of the second data packet consists of the first data portion, and the data payload of the third data packet consists of the second data portion.

20. The method of claim 1, wherein the data operation includes an interleave operation for interleaving the first data portion and the second data portion.

21. The method of claim 1, wherein the data operation includes a sign extend operation for extending a sign data bit of the first data portion and extending a sign data bit of the second data portion.

22. The method of claim 1, wherein the data operation includes a data flip operation for flipping data bits of the first data portion and flipping data bits of the second data portion.

23. The method of claim 1, wherein the data operation includes a post dynamic ranging operation for truncating at least one most significant data bit of the first data portion and truncating at least one most significant data bit of the second data portion.

24. The method of claim 1, wherein the data operation includes a data reorder operation for reordering the first data portion and the second data portion.

* * * * *